US011455206B2

(12) United States Patent
Ganesan et al.

(10) Patent No.: US 11,455,206 B2
(45) Date of Patent: Sep. 27, 2022

(54) USAGE-BANDED ANOMALY DETECTION AND REMEDIATION UTILIZING ANALYSIS OF SYSTEM METRICS

(71) Applicant: Dell Products L.P., Round Rock, TX (US)

(72) Inventors: Vaideeswaran Ganesan, Bangalore (IN); Ankit Singh, Bangalore (IN); Deepaganesh Paulraj, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/179,748

(22) Filed: Feb. 19, 2021

(65) Prior Publication Data

US 2022/0269555 A1 Aug. 25, 2022

(51) Int. Cl.
*G06F 11/00* (2006.01)
*G06F 11/07* (2006.01)
*G06F 11/34* (2006.01)
*G06F 11/32* (2006.01)

(52) U.S. Cl.
CPC ........ *G06F 11/0793* (2013.01); *G06F 11/327* (2013.01); *G06F 11/3433* (2013.01); *G06F 11/3476* (2013.01); *G06F 11/3495* (2013.01)

(58) Field of Classification Search
CPC ............ G06F 11/3616; G06F 11/3051; G06F 11/3055; G06F 11/00; G06F 11/3089; G06F 11/30; G06F 11/0781; G06F 11/0778; G06F 11/3072; G06F 11/0793; G06F 11/3466; G06F 11/3409; G06F 11/079
See application file for complete search history.

(56) References Cited

U.S. PATENT DOCUMENTS

2017/0161170 A1* 6/2017 Chen .................. G06N 20/00
2017/0329660 A1* 11/2017 Salunke ............ G06F 11/3409
2019/0250970 A1* 8/2019 Gupta ................ G06F 11/0709

OTHER PUBLICATIONS

X.-R. Sheng et al., "Multi-View Anomaly Detection: Neighborhood in Locality Matters," The Thirty-Third AAAI Conference on Artificial Intelligence, Jan. 27-Feb. 1, 2019, pp. 4894-4901.

(Continued)

*Primary Examiner* — Charles Ehne
(74) *Attorney, Agent, or Firm* — Ryan, Mason & Lewis, LLP (57) ABSTRACT

A method comprises collecting a set of data from an information processing system, wherein the set of data represents one or more system metrics associated with the information processing system. The method tags data values in the collected set of data with usage bands selected from a plurality of predefined usage bands, wherein each usage band represents a unique range of values within which data values in the set of data can be categorized. Further, the tagged data values are segregated into at least a first set and a second set based on the usage bands. A first anomaly detection algorithm is applied to the first set and a second anomaly detection algorithm is applied to the second set to generate anomaly data sets. The anomaly data sets are mapped back to the collected set of data to identify one or more specific anomalies.

20 Claims, 4 Drawing Sheets

(56) References Cited

OTHER PUBLICATIONS

C. Feng et al., "Multi-level Anomaly Detection in Industrial Control Systems via Package Signatures and LSTM Networks," 47th Annual IEEE/IFIP International Conference on Dependable Systems and Networks, Jul. 2017, 12 pages.

B. Nolan, "An Easy Fix for Your Slow VM Performance Explained," http://blog.raxco.com/2015/03/12/an-easy-fix-for-your-slow-vm-performance-explained/, Mar. 12, 2015, 20 pages.

NVM Express, "NVM Express, Revision 1.3," NVM Express, May 1, 2017, 282 pages.

* cited by examiner

RECENT LOGS

| SEVERITY | DESCRIPTION | DATE AND TIME ⌄ |
|---|---|---|
| ⊗ | THE WATCHDOG TIMER EXPIRED. | THU 14 MAY 2020 15:31:5? |
| ⊗ | THE WATCHDOG TIMER EXPIRED. | WED 13 MAY 2020 15:14:?? |
| ✓ | C:BOOT COMPLETED. | FRI 08 MAY 2020 21:47:59 |
| ✓ | OEM SOFTWARE EVENT | FRI 08 MAY 2020 21:47:59 |
| ✓ | OEM SOFTWARE EVENT | FRI 08 MAY 2020 18:36:27 |
| ✓ | OEM SOFTWARE EVENT | FRI 08 MAY 2020 18:36:27 |
| ✓ | OEM SOFTWARE EVENT | FRI 08 MAY 2020 18:36:27 |
| ✓ | OEM SOFTWARE EVENT | FRI 08 MAY 2020 18:36:27 |
| ✓ | OEM SOFTWARE EVENT | FRI 08 MAY 2020 18:36:27 |

VIEW 🖳 VIRTUAL CONSOLE

LAUNCH VIRTUAL CONSOLE

USAGE-BANDED ANOMALY DETECTION AND REMEDIATION UTILIZING ANALYSIS OF SYSTEM METRICS

FIELD

The field relates generally to information processing systems, and more particularly to anomaly detection in information processing systems.

BACKGROUND

Storage arrays and other types of storage systems are often shared by multiple host devices over a network. Applications running on the host devices each include one or more processes that perform the application functionality. The processes issue input-output (IO) operations directed to particular logical storage volumes or other logical storage devices, for delivery by the host devices over selected paths to storage ports of the storage system. Different ones of the host devices can run different applications with varying workloads and associated IO patterns. Such host devices also generate additional IO operations in performing various data services such as migration and replication. Various types of storage access protocols can be used by host devices to access the logical storage volumes or other logical storage devices of the storage system including, by way of example only, Small Computer System Interface (SCSI) access protocols and NVM Express (NVMe) access protocols.

An information processing system comprising one or more storage systems of the type noted above may be configured to incorporate some functionality to detect anomalies in the system, and possibly remediate the anomalies, in order to improve performance of the system and/or protect the system against malicious activity.

SUMMARY

Illustrative embodiments provide usage-banded anomaly detection utilizing analysis of one or more metrics associated with an information processing system with which the anomaly detection is implemented.

For example, in an illustrative embodiment, a method comprises collecting a set of data from an information processing system, wherein the set of data represents one or more system metrics associated with the information processing system. The method tags data values in the collected set of data with usage bands selected from a plurality of predefined usage bands, wherein each usage band in the plurality of predefined usage bands represents a unique range of values within which data values in the set of data can be categorized. Further, the method segregates the tagged data values into at least a first set and a second set based on the usage bands. A first anomaly detection algorithm is applied to the first set and a second anomaly detection algorithm is applied to the second set to generate anomaly data sets. Still further, the method maps the anomaly data sets back to the collected set of data to identify one or more specific anomalies in the set of data.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
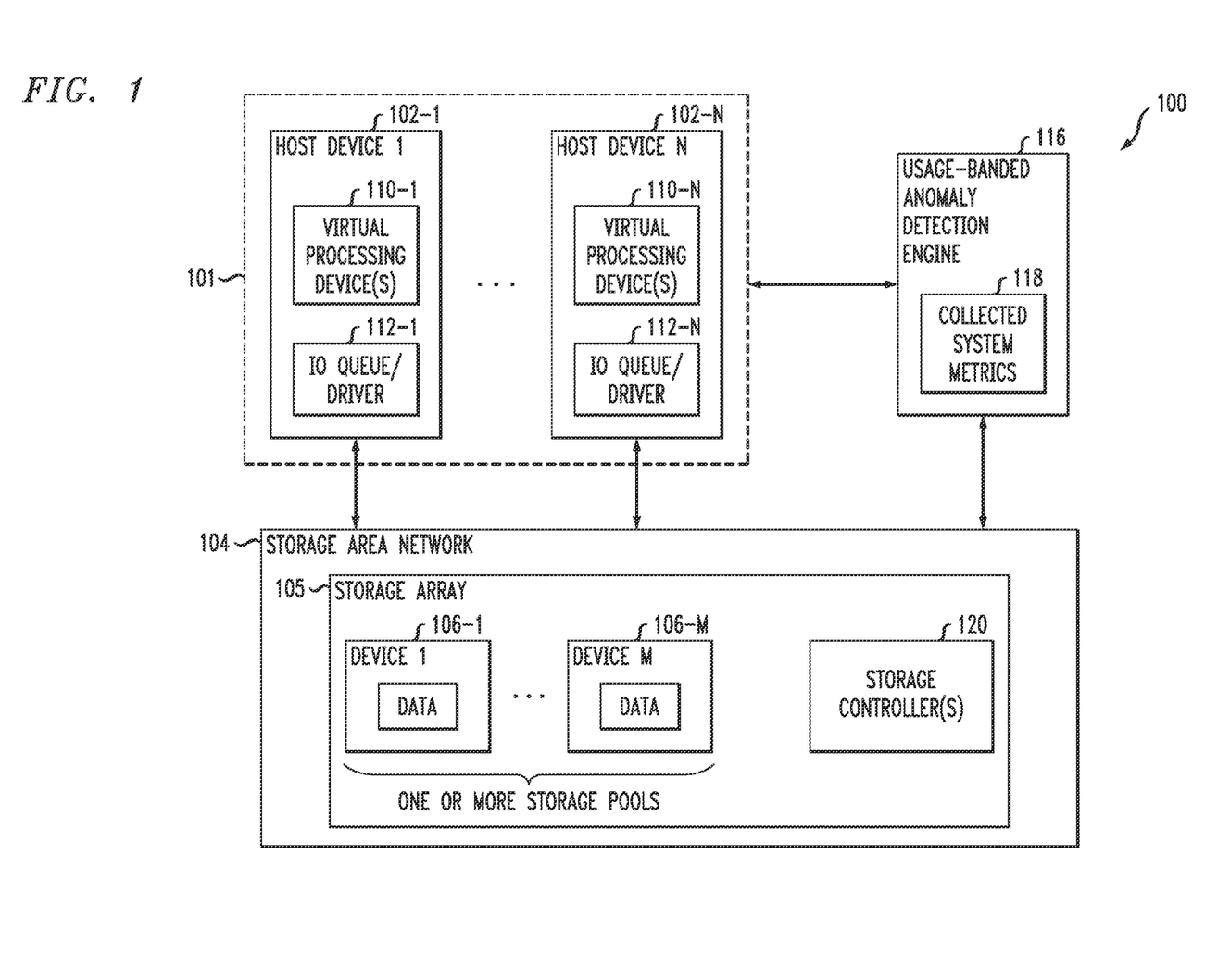
FIG. 1 depicts an information processing system configured with functionality for automated usage-banded anomaly detection and remediation utilizing analysis of system metrics, according to an illustrative embodiment.

FIG. 1 shows an information processing system 100 configured in accordance with an illustrative embodiment. The information processing system 100 comprises a computer system 101 illustratively comprising a plurality of host devices 102-1, . . . 102-N. The host devices 102 communicate over a storage area network (SAN) 104 with at least one storage array 105. The storage array 105 comprises a plurality of storage devices 106-1, . . . 106-M each storing data utilized by one or more applications running on one or more of the host devices 102. The storage devices 106 are illustratively arranged in one or more storage pools.

The storage array 105 and its associated storage devices 106 are an example of what is more generally referred to herein as a "storage system." This storage system in the present embodiment is shared by the host devices 102, and is therefore also referred to herein as a "shared storage system." Other embodiments can include only a single host device, possibly configured to have exclusive use of the storage system.

The host devices 102 illustratively comprise respective computers, servers or other types of processing devices capable of communicating with the storage array 105 over the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 106 of the storage array 105 of SAN 104 implement logical units (LUNs) configured to store objects for users associated with the host devices 102. These objects can comprise files, blocks or other types of objects. The host devices 102 interact with the storage array 105 utilizing read and write commands as well as other types of commands that are transmitted over the SAN 104. Such commands in some embodiments more particularly comprise Small Computer System Interface (SCSI) commands of a SCSI access protocol and/or NVM Express (NVMe) commands of an NVMe access protocol, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes.

Each of the host devices 102 illustratively has one or more paths to the storage array 105, with at least one of the storage devices 106 of the storage array 105 being visible to that host device on a given one of the paths. A given one of the storage devices 106 may be accessible to the given host device over multiple paths.

Different ones of the storage devices 106 of the storage array 105 illustratively exhibit different latencies in processing of IO operations. In some cases, the same storage device may exhibit different latencies for different ones of multiple paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs. For example, as illustrated in each host device 102, one or more virtual processing devices 110 are shown (i.e., virtual processing device(s) 110-1, . . . 110-N respectively associated with host devices 102-1, . . . 102-N). A virtual processing device as that term is broadly used herein illustratively comprises one or more VMs, containers, or combinations thereof.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand (IB), Gigabit Ethernet or Fibre Channel (FC). Numerous alternative networking arrangements are possible in a given embodiment, as will be appreciated by those skilled in the art.

The host devices 102 comprise respective sets of IO queues/drivers 112-1, . . . 112-N. The IO queue portion of each IO queue/driver 112 is configured to queue IO operations generated by the virtual processing devices 110. That is, the sources of the IO operations queued in the IO queues illustratively include respective processes of one or more applications executing on the virtual processing devices 110 of the host device 102. For example, IO operations can be generated by each of multiple processes of a database application running on one or more virtual processing devices 110 of the host device 102. Such processes issue IO operations for delivery to the storage array 105 over the SAN 104. Other types of sources of IO operations may be present in a given implementation of system 100. A given IO operation is therefore illustratively generated by a process of an application running on the host device 102, and is queued in a given one of the IO queues of the host device 102 with other operations generated by other processes of that application, and possibly other processes of other applications.

The IO driver portion of each IO queue/driver 112 is configured to deliver IO operations selected from its corresponding IO queue to the storage array 105 via one or more selected paths over the SAN 104. The IO drivers collectively comprise a path layer of the host devices 102. Path selection functionality for delivery of IO operations from the host devices 102 to the storage array 105 is provided in the path layer by respective instances of the IO drivers. In some embodiments, the path layer is a multi-path layer and thus IO drivers can be considered multi-path IO (MPIO) drivers. The MPIO drivers may comprise, for example, PowerPath® drivers from Dell Technologies. Other types of IO drivers from other driver vendors may be implemented.

The host devices 102 can include additional or alternative components. For example, in some embodiments, the host devices 102 comprise respective local caches, implemented using respective memories of those host devices. A wide variety of different caching techniques can be used in other embodiments, as will be appreciated by those skilled in the art. Other examples of memories of the respective host devices 102 that may be utilized to provide local caches include one or more memory cards or other memory devices, such as, for example, an NVMe over PCIe cache card, a local flash drive or other type of NVM storage drive, or combinations of these and other host memory devices.

Communications between the host devices 102 and the storage array 105 can utilize an in-band communication mechanism in which one or more predetermined commands in a designated storage protocol are sent from the host device 102 to the storage array 105. Such predetermined commands can comprise, for example, a log sense command, a mode sense command, a "vendor unique command" or VU command, or combinations of multiple instances of these or other commands, in an otherwise standardized command format, such as a SCSI format or other type of format.

The above-noted command in some embodiments comprises at least one predetermined vendor unique or VU command of a storage access protocol which the host device 102 utilizes to communicate with the storage array 105, such as a SCSI or NVMe protocol. A wide variety of different arrangements of commands may be used, as well as numerous associated timing techniques for repeatedly sending such commands from the host device 102 to the storage array 105. A "command" as the term is broadly used herein can comprise a combination of multiple distinct commands, such as respective different commands for different ones of a plurality of initiators.

It is also possible for the host devices 102 and the storage array 105 to communicate via one or more out-of-band communication mechanisms. For example, an out-of-band communication mechanism of this type can involve host management software of the host device 102 communicating with storage array management software of the storage array 105 over an IP network connection or other type of network connection. Such host management software can include software running on the individual host devices 102.

Additional components not explicitly shown in the figure, such as one or more storage caches, may also be provided in the storage array 105 for use in processing IO operations. For example, in some embodiments, each of the storage controllers 120 has a different local cache or a different allocated portion of a global cache associated therewith, although numerous alternative arrangements are possible. The storage controllers 120 can be implemented as respective storage processors, directors or other storage system components configured to control storage system operations relating to processing of IO operations.

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF.

The storage array 105 in the present embodiment is assumed to comprise a persistent memory that is implemented using a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays, or may be implemented in whole or in part using other types of non-volatile memory.

The storage array 105 in the present embodiment may comprise additional components not explicitly shown in the figure, such as a response time control module and IO operation priority queues, illustratively configured to make use of the above-described persistent memory. For example, the response time control module may be used to implement storage array based adjustments in response time for particular IO operations based at least in part on service level objective (SLO) information stored by the storage array 105 in its persistent memory. The response time control module is assumed to operate in conjunction with the above-noted IO operation priority queues.

The storage array 105 illustratively utilizes its IO operation priority queues to provide different levels of performance for IO operations. For example, the IO operation priority queues may have respective different priority levels. The storage array 105 may be configured to provide different priority levels for different ones of the IO operations by assigning different ones of the IO operations to different ones of the IO operation priority queues. The IO operation priority queues are illustratively associated with respective SLOs for processing of IO operations in the storage array 105.

As mentioned above, communications between the host devices 102 and the storage array 105 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage array 105 in some embodiments may be implemented as part of cloud infrastructure in the form of a cloud-based system such as an Amazon Web Services (AWS) system. Other examples of cloud-based systems that can be used to provide at least portions of the storage array 105 and possibly other portions of system 100 include Google Cloud Platform (GCP) and Microsoft Azure.

The storage devices 106 of the storage arrays 105 can be implemented using solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 106.

The storage array 105 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array. For example, the storage array 105 may comprise one or more storage arrays such as one or more VNX®, VMAX®, Unity™ or PowerMax™ storage arrays, commercially available from Dell Technologies.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

It is to be appreciated that these and other features of illustrative embodiments are presented by way of example only, and should not be construed as limiting in any way.

Accordingly, different numbers, types and arrangements of system components such as host devices 102, SAN 104, storage array 105, storage devices 106 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

Further illustrated in FIG. 1 is a usage-banded anomaly detection engine 116 operatively coupled to each of the set of host devices 102 and to SAN 104. Usage-banded anomaly detection engine 116 is configured to collect system metrics 118 and perform automated usage-banded anomaly detection and remediation utilizing analysis of collected system metrics 118, as will be further explained below.

It is realized herein that in some scenarios, existing anomaly detection cannot capture certain performance-impacting and/or security-impacting issues. By way of example only, assume that in-band performance of system 100 can be impacted due to out-of-band request processing, e.g., a VM request timeout when an iDRAC request for a foreign disk check is generated. iDRAC is an integrated Dell Remote Access Controller designed for secure local and remote server management and helps IT administrators deploy, update and monitor servers in an information processing system. The iDRAC can be implemented in an external processing device or in one or more processing devices that constitute system 100. Once an issue such as the above VM request/iDRAC request issue becomes persistent, existing anomaly detection loses its assessment value since the data values become too frequent. That is, they become recognized as a specific pattern and hence the anomaly assessment is lost. This is due, at least in part, to the way in which analytics uses historical data to compute anomalies. That is, an abnormal situation that repeats itself for some time will be reported as normal behavior by existing anomaly detection algorithms, thus causing invalid situations to be treated as normal system behaviors.

Illustrative embodiments overcome this and other drawbacks associated with existing anomaly detection by providing a usage-banded anomaly detection approach that can correctly identify these kind of performance issues, as well as many others. More particularly, illustrative embodiments provide usage band-based (usage-banded) anomaly detection that identifies the above performance-impacting and/or security-impacting issues by tagging system metric data with usage bands. For example, in some embodiments, the usages are the values of individual properties of the features that are mapped to a normal binomial distribution curve (Gaussian or bell curve), and then the system metric data is split into at least two parts: (i) those data points which indicate usually normal behaviors (a maximal data set); and (ii) those which indicate unusual behaviors (an outlier data set). These two data sets are then analyzed differently as will be further explained in detail below.

Illustrative embodiments collect system metrics 118, as explained above, which can be categorized, by way of example, as "determinants" and "variables." Determinants include data and metrics that are of interest, for example, to a user (e.g., customer, administrator, other system, etc.). Examples of determinants include, but are not limited to, key performance indicators such as central processing unit (CPU) utilization, power consumption, IO performance, etc. Variables include data and metrics that impact or can impact the determinant metrics. By way of example, variables can include metrics which have an impact on latency. Examples of variables include, but are not limited to: (i) storage metrics such as controller queue size, predictive failure, number of bad blocks, inverse of disk fragmentation, inverse disk usage ratio, etc.; (ii) iDRAC metrics such as polling frequency of a foreign configuration, PERC parameters, etc.; and (iii) network metrics such as busy-ness (IO sent/max bandwidth), QoS parameters, network efficiency (1—IO errors/IO sent), etc. Note that PERC (PowerEdge™ RAID controller card) parameters are parameters associated with a storage management application commercially available from Dell Technologies that provides a server configuration utility for a PowerEdge™ server.

In one or more illustrative embodiments, collected system metrics 118 are converted into normalized values to facilitate usage-banded anomaly detection. The normalization can be applied based on the metric type. Examples of usage bands are value ranges of the above metrics.

In one example, each of the above metrics (determinants and variables) can be categorized into one of a plurality of categories or bands based on a normal curve distribution. Normal curve distribution (also known as Gaussian distribution) is a bell-shaped curve that assumes, during any measurement, values will follow a normal distribution with an equal number of measurements above and below the mean value.

In one non-limiting example, assume the following usage bands: Unused (0-7%); Low Usage (8-17%); Average Usage (18-82%); High Usage (83-92%), and Peak Usage (93-100%). For example, assume the maximum controller queue size (which is an example of a variable metric as illustratively used herein) is 64. Thus, usage bands for this particular metric can define: a controller queue size of 0-5 is categorized in the Unused usage band; a controller queue size of 6-10 is categorized in the Low usage band; a controller queue size of 11-53 is categorized in the Average usage band; a controller queue size of 54-58 is categorized in the High usage band; and a controller queue size of 59-64 is categorized in the Peak usage band.

Figure 2A:
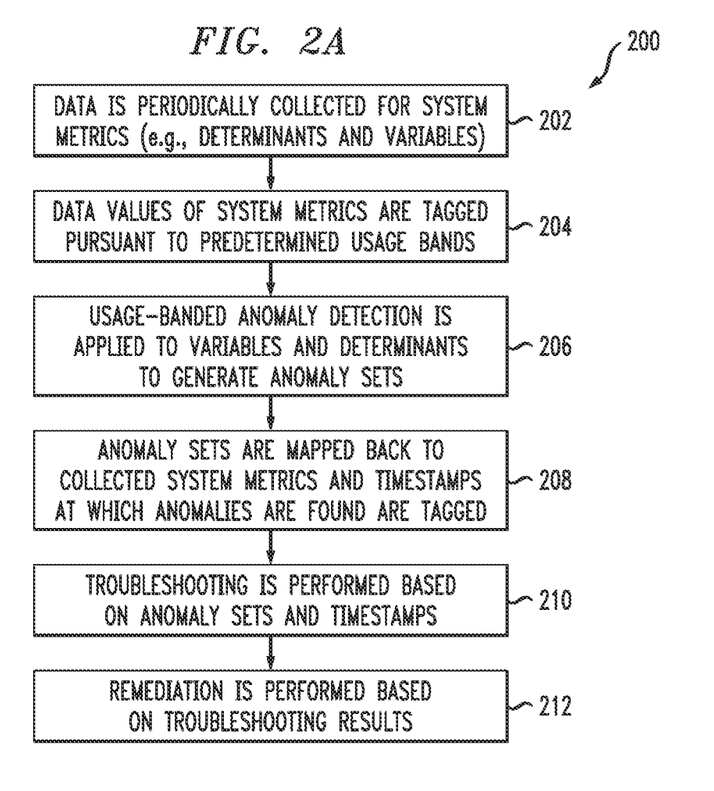
FIGS. 2A and 2B depict a methodology for automated usage-banded anomaly detection and remediation utilizing analysis of system metrics, according to an illustrative embodiment.
Figure 2B:
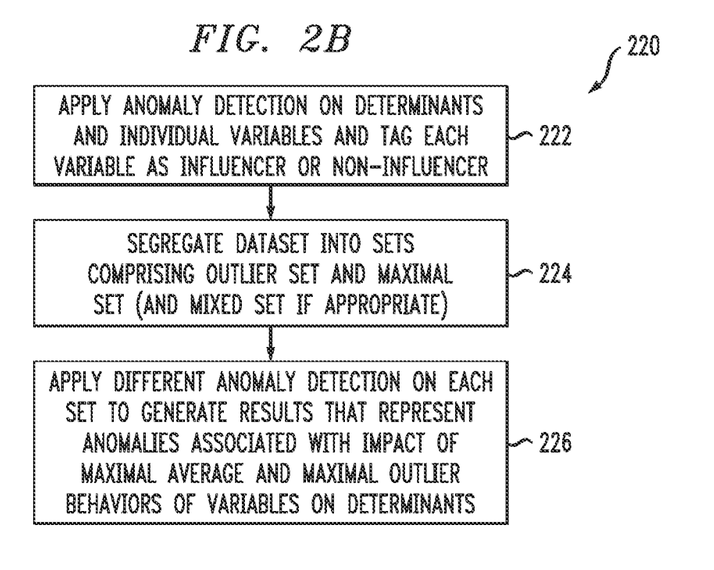

FIGS. 2A and 2B illustrate a methodology for automated usage-banded anomaly detection and remediation utilizing analysis of collected system metrics, according to an illustrative embodiment. More particularly, FIG. 2A illustrates process 200 which includes steps 202 through 212, while FIG. 2B illustrates process 220 including steps 222 through 226, wherein process 220 is an example of sub-steps of step 206 of FIG. 2A. It is to be appreciated that while the methodology in FIGS. 2A and 2B is suitable for use in system 100, it is generally applicable to other types of systems.

The steps of the FIGS. 2A and 2B processes are illustratively performed at least in part by or under the control of usage-banded anomaly detection engine 116. Other arrangements of system components can be configured to perform at least portions of one or more of the steps in other embodiments. For example, all or parts of processes 200 and 220 can be performed in one or more host servers 102, SAN 104, one or more external processing devices, or combinations thereof.

Referring now to process 200 in FIG. 2A, in step 202, data is periodically collected for both types of system metrics, i.e., determinants and variables. The period for collection is preset by an administrator and/or some other system based on the particular information processing system with which the usage-banded anomaly detection is being implemented.

With reference back to the FIG. 1 system, it is to be appreciated that data for determinants such as CPU utilization, power consumption, and IO performance, and data for variables such as controller queue size, predictive failure, number of bad blocks, inverse of disk fragmentation, inverse disk usage ratio, polling frequency of a foreign configuration, PERC parameters, busy-ness, QoS parameters, network efficiency, are collectable from one or more components of information processing system 100 such as host devices 102, virtual processing devices 110, IO queues/drivers 112, SAN 104, storage array 105, storage devices 106, storage controllers 120, as well as from other components associated with information processing system 100 that are not expressly shown. In some embodiments data is pulled from one or more components by usage-banded anomaly detection engine 116, in other embodiments data can be pushed from one or more components to usage-banded anomaly detection engine 116, while in further embodiments a combination of pushing/pulling data can be implemented. In some embodiments, usage-banded anomaly detection engine 116 can deploy one or more agent modules (not expressly shown) to the one or more components of information processing system 100 to facilitate system metric collection, i.e., the one or more agent modules can be configured to obtain the system metric data and report the system metric data back to usage-banded anomaly detection engine 116. Regardless of the method of collection, the collected data is stored at usage-banded anomaly detection engine 116 as collected system metrics 118.

In step 204, each of the data values for the collected system metrics (determinants and variables) is tagged as per the usage bands. See the example above with respect to maximum controller queue size. Assume a controller queue size of 15 is received as a data value. Such data value would be tagged as being in the Average usage band since it falls within the 11-53 range of the Average usage band in the example above.

In step 206, usage-banded anomaly detection is applied to the usage-band tagged variables and determinants. In one illustrative embodiment, usage-banded anomaly detection is performed as shown in process 220 of FIG. 2B. Again, usage-banded anomaly detection engine 116 performs the steps of process 220.

Turning to step 222 of FIG. 2B, an anomaly detection algorithm is applied to the determinants and the individual variables. If there are no anomalies found or anomalies are extremely rare, then the variables are tagged as "non-influencers." All others variables are tagged as "influencers."

In step 224 of FIG. 2B, the dataset (data values for determinants and variables) is segregated into two sets: an outlier set and a maximal set. Assuming, by way of example only, a tabular format for the collected data, the maximal set contains all rows in the data which have average values of influencers. The outlier set contains all rows of data which do not belong to the maximal set. In some embodiments, when there are mixed rows (some with average values and some with other values), a mixed set can be created based on whether or not there is a sufficient number of rows in the data. The number of rows that constitute a sufficient number can be preset by an administrator and/or a system. Otherwise, in other embodiments, that mixed data is merged into the maximal set or the outlier set.

In step 226 of FIG. 2B, a different anomaly detection algorithm is now executed on each of the sets. In some embodiments, a first anomaly detection algorithm searches for minimal data concentrations for the maximal and mixed sets, and a second anomaly detection algorithm searches for maximal data concentrations for the mixed and outlier sets. The resultant anomaly sets, i.e., a minimal data concentration set and a maximal data concentration set, now represent the anomalies associated with the impact of the maximal average and the maximal outlier behaviors of the various variables on the determinants.

Returning to process 200 of FIG. 2A, the anomaly sets generated by process 220 of FIG. 2B, are combined and mapped back into the collected data in step 208, and the timestamps at which the anomalies in the anomaly sets are found are tagged.

In step 210, given the anomalies in the anomaly sets, anomaly troubleshooting is performed. By way of example only, in a scenario mentioned above wherein an out-of-band iDRAC request can have a significant adverse influence on an in-band VM request, these timestamps can be mapped to lifecycle controller logs and/or operating system logs, and the messages/commands within the temporal vicinity of the anomaly are identified. These messages/commands can provide indication to an administrator and/or a system of a potential issue requiring, or otherwise benefiting from, remediation.

In step 212, remediation, or at least partial remediation, can be provided here when an appropriate action can be identified, by way of example only, some actions associated with tuning storage and/or network modules for selective out-of-range values. For example, actions may comprise adjusting one or more variables based on their tagged usage band such as adjusting the polling frequency of the foreign configuration, increasing the controller queue size, increasing buffers, adjusting kernel parameters, increasing memory, or halting certain processes. That is, since the system metrics are tagged by a predefined usage band, one or more system metrics can be adjusted following anomaly detection operations to try to remedy the performance-impacting and/or security-impacting anomalies. Usage-banded anomaly detection can then be repeated to check whether the remediation actions had a corrective impact.

Usage-banded anomaly detection engine 116 can perform the troubleshooting and remediation steps and/or can cause one or more components associated with information processing system 100 to perform the steps. For example, usage-banded anomaly detection engine 116 can send one or more instructions or commands to such components to have the components perform or cause performance of the troubleshooting and remediation, and/or to an administrator or other system which performs the steps or causes the steps to be performed.

The particular processing operations and other system functionality described in conjunction with the flow diagrams of FIGS. 2A and 2B are presented by way of illustrative example only, and should not be construed as limiting the scope of the disclosure in any way. Alternative embodiments can use other types of processing operations involving host devices, storage systems and functionality for anomaly detection and remediation. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different anomaly detection and remediation arrangements within a given information processing system.

Functionality such as that described in conjunction with the flow diagrams of FIGS. 2A and 2B can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figure 2C:
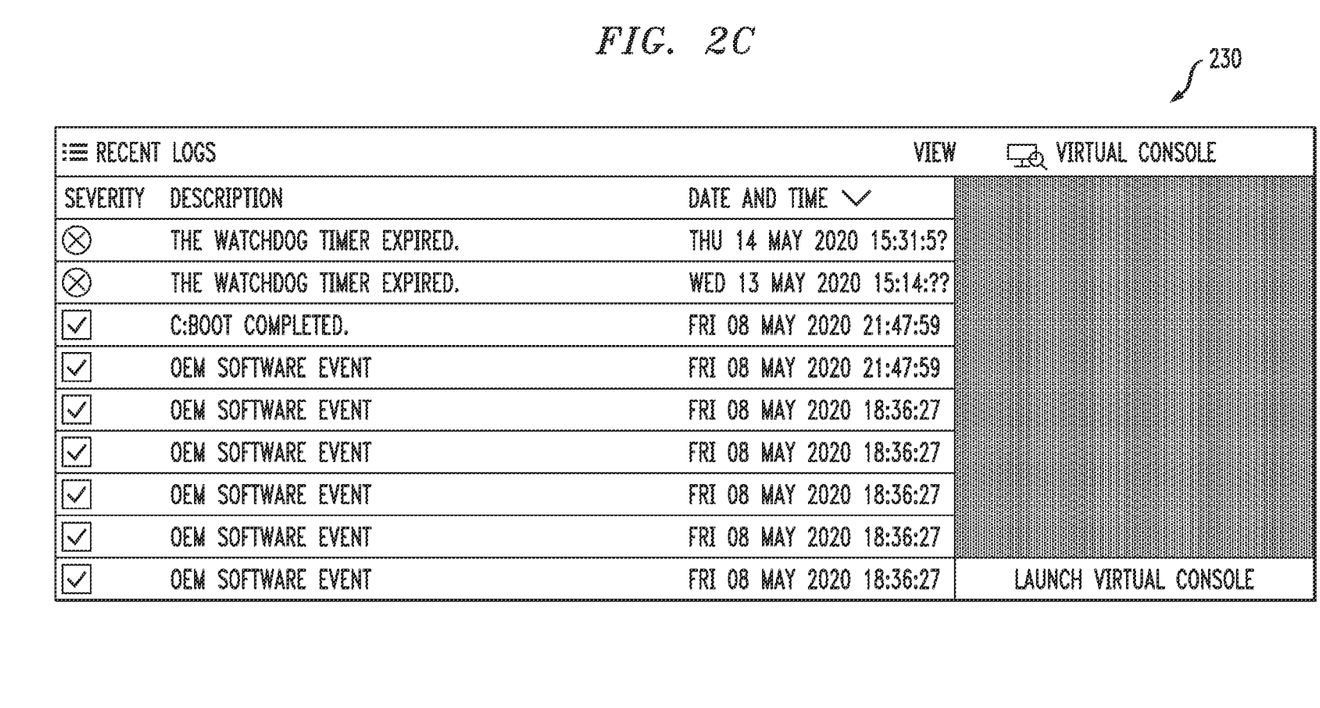
FIG. 2C depicts a troubleshooting example based on the methodology of FIGS. 2A and 2B.

FIG. 2C illustrates a non-limiting troubleshooting example 230 using processes 200 and 220 of FIGS. 2A and 2B. Assuming anomalies are detected as explained above in the context of FIGS. 2A and 2B. Root cause analysis can be applied on poor metric performance by using correlation analysis of the spatial time of the highest IG (Inverse Gaussian) attributes and multi-vector mapping against the poor performance attribute. Assume a host CPU is heavily loaded servicing an operation such as VM stress (JIT-167099). Further assume, the host CPU cannot perform the refreshing of the IPMI (Intelligent Platform Management Interface) watchdog timer over a KCS (Keyboard Controller Style) interface. If so, in LCL (Lifecycle Controller Log) ASR0000, the message "The watchdog timer expired" will be logged (as shown in example 230 in FIG. 2C). Thus, the LCL ASR0000 is considered as the highest IG attribute to map the root cause of the CPU load. Similarly, the iDRAC LCL message, such as foreign disk check before the VM timeout, is linked for the root cause of the out-of-band operation impacting the in-band performance, and the operation foreign disk check is marked as the highest IG attribute. As such, based on this troubleshooting, some remedial action can be implemented to mitigate the adverse impact of the iDRAC-related out-of-band operation on the VM-related in-band operation.

Advantageously, usage-banded anomaly detection ensures that the subject data is categorized based on usage patterns normalized to normal curve distribution patterns, and different versions of the algorithm are run on the isolated datasets.

It is realized herein that a random forest algorithm is a mechanism where multiple artificial intelligence (AI)/machine learning (ML) models are created with different random samples of test data. The models are averaged out to obtain the final model. While the random forest algorithm provides a highly accurate model, random forest processing is complex and a large set of trees is needed to solve the problem (the more trees, the more robust the solution). On the other hand, illustrative embodiments applied to random forest processing provide that, if anomalies are removed or otherwise mitigated, it would provide a much more manageable set of trees as well as ensure a better prediction. Thus, illustrative embodiments can provide a modified form of a random forest algorithm that leverage anomalies to obtain a better prediction. Furthermore, in one or more alternative embodiments, AI/ML techniques can be used to determine the usage bands.

Illustrative embodiments of processing platforms will now be described in greater detail with reference to FIGS. 3 and 4.

Figure 3:
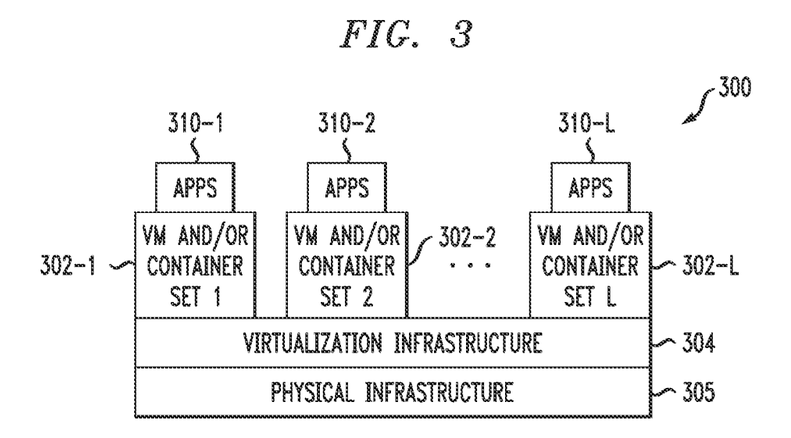
FIGS. 3 and 4 depict examples of processing platforms that may be utilized to implement at least a portion of an information processing system with automated usage-banded anomaly detection and remediation utilizing analysis of system metrics, according to illustrative embodiments.
Figure 4:
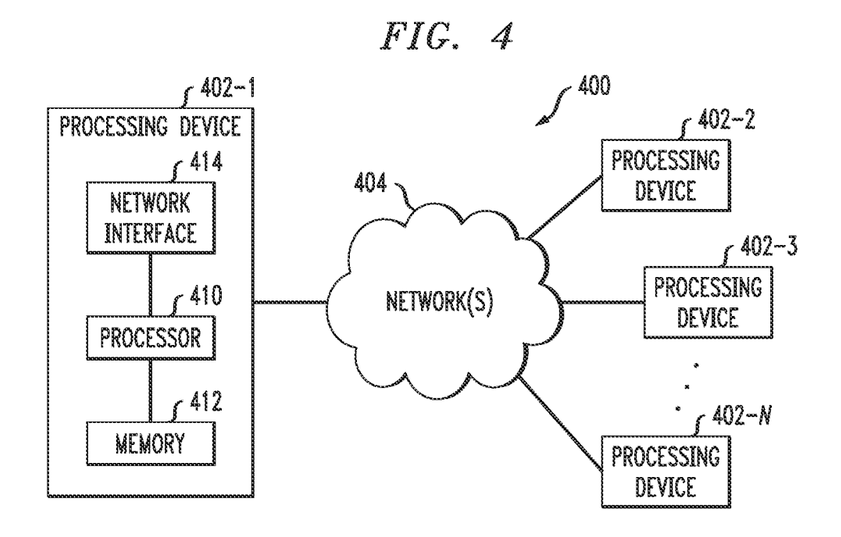

FIG. 3 shows an example processing platform comprising cloud infrastructure 300. The cloud infrastructure 300 comprises a combination of physical and virtual processing resources that may be utilized to implement at least a portion of the information processing systems described herein. The cloud infrastructure 300 comprises multiple virtual machines (VMs) and/or container sets 302-1, 302-2, . . . 302-L implemented using virtualization infrastructure 304. The virtualization infrastructure 304 runs on physical infrastructure 305, and illustratively comprises one or more hypervisors and/or operating system level virtualization infrastructure. The operating system level virtualization infrastructure illustratively comprises kernel control groups of a Linux operating system or other type of operating system.

The cloud infrastructure 300 further comprises sets of applications 310-1, 310-2, . . . 310-L running on respective ones of the VMs/container sets 302-1, 302-2, . . . 302-L under the control of the virtualization infrastructure 304. The VMs/container sets 302 may comprise respective VMs, respective sets of one or more containers, or respective sets of one or more containers running in VMs.

In some implementations of the FIG. 3 embodiment, the VMs/container sets 302 comprise respective VMs implemented using virtualization infrastructure 304 that comprises at least one hypervisor. A hypervisor platform may be used to implement a hypervisor within the virtualization infrastructure 304, where the hypervisor platform has an associated virtual infrastructure management system. The underlying physical machines may comprise one or more distributed processing platforms that include one or more storage systems.

In other implementations of the FIG. 3 embodiment, the VMs/container sets 302 comprise respective containers implemented using virtualization infrastructure 304 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 300 shown in FIG. 3 may represent at least a portion of one processing platform. Another example of such a processing platform is processing platform 400 shown in FIG. 4.

The processing platform 400 in this embodiment comprises a portion of system 100 or 300 and includes a plurality of processing devices, denoted 402-1, 402-2, 402-3, . . . 402-N, which communicate with one another over a network 404.

The network 404 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 402-1 in the processing platform 400 comprises a processor 410 coupled to a memory 412. The processor 410 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 412 may comprise random access memory (RAM), read-only memory (ROM), flash memory or other types of memory, in any combination. The memory 412 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 402-1 is network interface circuitry 414, which is used to interface the processing device with the network 404 and other system components, and may comprise conventional transceivers.

The other processing devices 402 of the processing platform 400 are assumed to be configured in a manner similar to that shown for processing device 402-1 in the figure.

Again, the particular processing platform 400 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more components of the FIG. 1 system as disclosed herein are illustratively implemented in the form of software running on one or more processing devices.

Many advantages are realized from the above-described usage-banded anomaly detection techniques. For example, illustrative embodiments provide the ability to isolate anomalies even when anomaly patterns happen for a relatively long duration. Advantageously, this can be accomplished without the need for additional data cleansing stages. Illustrative embodiments define usage bands for the purpose of anomaly detection, and bisect the system metric data into at least two sets, i.e., outlier and maximal sets, based on usage band analysis. Further, illustrative embodiments run different types of anomaly detection on these sets (e.g., dense points for outlier sets and sparse points for maximal sets) and combine the results, mapping them to existing anomaly detection methods. Still further, illustrative embodiments provide potential remediation by tuning variables based on the usage bands. Additionally, such usage band techniques can be applied to random forest algorithms to improve prediction. Many other advantages will be realized from the illustrative embodiments described herein.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory, the at least one processing device, when executing program code, is configured to:
collect a set of data from an information processing system, wherein the set of data represents one or more system metrics associated with the information processing system;
tag data values in the collected set of data with usage bands selected from a plurality of predefined usage bands, wherein each usage band in the plurality of predefined usage bands represents a unique range of values within which data values in the set of data can be categorized;
detect one or more usage band anomalies associated with the one or more system metrics of the set of data and the tagged data values;
segregate the tagged data values into at least a first set and a second set based on the usage bands, the first set containing data associated with the detected one or more usage band anomalies, and the second set containing data which does not belong to the first set;
apply a first anomaly detection algorithm to the first set and a second anomaly detection algorithm to the second set to generate anomaly data sets; and
map the anomaly data sets back to the collected set of data to identify one or more specific anomalies in the set of data;
wherein the first anomaly detection algorithm searches for first data concentrations for at least the first set, and the second anomaly detection algorithm searches for second data concentrations for at least the second set.

2. The apparatus of claim 1, wherein the processing device, when executing program code, is further configured to cause a remediation of the one or more specific anomalies.

3. The apparatus of claim 1, wherein the processing device, when executing program code, is further configured to normalize the collected set of data.

4. The apparatus of claim 3, wherein the collected set of data is normalized using a normal curve distribution.

5. The apparatus of claim 1, wherein the set of data collected from the information processing system comprises different types of system metrics.

6. The apparatus of claim 5, wherein one type of system metric comprises determinants and another type of system metric comprises variables.

7. The apparatus of claim 6, wherein the processing device, when executing program code, is further configured to apply anomaly detection to the determinants and the variables such that, when no anomalies are found, one or more of the variables are tagged as non-influencers, while remaining ones of the variables are tagged as influencers.

8. The apparatus of claim 7, wherein the first set comprises data which has average values of influencers.

9. The apparatus of claim 8, wherein segregating at least a portion of the tagged data values into a third set containing mixed data with average values and other values.

10. The apparatus of claim 1, wherein the first data concentrations comprise minimal data concentrations and wherein the second data concentrations comprise maximal data concentrations.

11. A method comprising:
collecting a set of data from an information processing system, wherein the set of data represents one or more system metrics associated with the information processing system;
tagging data values in the collected set of data with usage bands selected from a plurality of predefined usage bands, wherein each usage band in the plurality of predefined usage bands represents a unique range of values within which data values in the set of data can be categorized;
detecting one or more usage band anomalies associated with the one or more system metrics of the set of data and the tagged data values;
segregating the tagged data values into at least a first set and a second set based on the usage bands, the first set containing data associated with the detected one or more usage band anomalies, and the second set containing data which does not belong to the first set;
applying a first anomaly detection algorithm to the first set and a second anomaly detection algorithm to the second set to generate anomaly data sets; and
mapping the anomaly data sets back to the collected set of data to identify one or more specific anomalies in the set of data;
wherein the first anomaly detection algorithm searches for first data concentrations for at least the first set, and the second anomaly detection algorithm searches for second data concentrations for at least the second set; and
wherein the steps are performed by at least one processing device, comprising a processor coupled to a memory, executing program code.

12. The method of claim 11, further comprising causing remediation of the one or more specific anomalies.

13. The method of claim 11, further comprising normalizing the collected set of data using a normal curve distribution.

14. The method of claim 11, wherein the set of data collected from the information processing system comprises different types of system metrics.

15. The method of claim 14, wherein one type of system metric comprises determinants and another type of system metric comprises variables.

16. The method of claim 15, wherein the processing device, when executing program code, is further configured to apply anomaly detection to the determinants and the variables such that, when no anomalies are found, one or more of the variables are tagged as non-influencers, while remaining ones of the variables are tagged as influencers.

17. The method of claim 16, wherein the first set comprises data which has average values of influencers.

18. A computer program product comprising a non-transitory processor-readable storage medium having stored therein program code of one or more software programs, wherein the program code when executed by at least one processing device cause the at least one processing device to:
collect a set of data from an information processing system, wherein the set of data represents one or more system metrics associated with the information processing system;
tag data values in the collected set of data with usage bands selected from a plurality of predefined usage bands, wherein each usage band in the plurality of predefined usage bands represents a unique range of values within which data values in the set of data can be categorized;

detect one or more usage band anomalies associated with the one or more system metrics of the set of data and the tagged data values;

segregate the tagged data values into at least a first set and a second set based on the usage bands, the first set containing data associated with the detected one or more usage band anomalies, and the second set containing data which does not belong to the first set;

apply a first anomaly detection algorithm to the first set and a second anomaly detection algorithm to the second set to generate anomaly data sets; and map the anomaly data sets back to the collected set of data to identify one or more specific anomalies in the set of data;

wherein the first anomaly detection algorithm searches for first data concentrations for at least the first set, and the second anomaly detection algorithm searches for second data concentrations for at least the second set.

19. The computer program product of claim 18, further comprising causing a remediation of the one or more specific anomalies.

20. The method of claim 11, wherein the first data concentrations comprise minimal data concentrations and wherein the second data concentrations comprise maximal data concentrations.

* * * * *